United States Patent [19]
Wong et al.

[11] 4,137,209
[45] Jan. 30, 1979

[54] GLASS FIBER SIZE COMPOSITION

[75] Inventors: Robert Wong; Martin C. Flautt, both of Granville, Ohio

[73] Assignee: Owens-Corning Fiberglas Corporation, Toledo, Ohio

[21] Appl. No.: 850,889

[22] Filed: Nov. 14, 1977

[51] Int. Cl.$^2$ ............................................. C08L 31/04
[52] U.S. Cl. .................................. 260/29.6 NR; 8/8; 428/425; 428/429; 428/441; 428/442
[58] Field of Search ....................... 260/29.6 NR; 8/8; 428/425, 429, 441, 442

[56] References Cited
U.S. PATENT DOCUMENTS

| | | | |
|---|---|---|---|
| 3,401,133 | 9/1968 | Grace et al. | 260/29.2 TN |
| 3,498,262 | 3/1970 | Hill et al. | 118/259 |
| 3,652,326 | 3/1972 | Ward | 260/29.6 NR |

Primary Examiner—M. J. Welsh
Attorney, Agent, or Firm—Ronald C. Hudgens; Philip R. Cloutier; James B. Wilkens

[57] ABSTRACT

A glass fiber size composition comprising a film-forming polymer, a thixotropic gelling agent, a heat-curable polyurethane latex and an organo silane coupling agent is disclosed. When a coloring agent is incorporated into the glass fiber size composition, the resulting sized glass fibers exhibit excellent color intensity.

8 Claims, No Drawings

GLASS FIBER SIZE COMPOSITION

This invention relates to size compositions.

More specifically, this invention relates to glass fiber size compositions.

In one of its more specific aspects, this invention relates to glass fiber size compositions suitable for imparting color to glass fibers.

The production of glass fiber fabrics and yarns is well known. The resulting fabrics and yarns can be used in both decorative and other textile applications. Generally, as has been the practice, individual glass fibers are coated at forming with a starch-based size and the sized fibers are brought together into a bundle or strand. The strand is then wound onto a forming package and thereafter strands are unwound from several forming packages and twisted onto a twist package to form a yarn. A plurality of twisted yarns can be unwound from twist packages and twisted together to form a plied yarn. A plurality of yarns are then wrapped on a cylinder to produce a beam, which beam is removed to a loom and woven into fabric.

A usual step in the production of glass fiber textile fabric, for both decorative and other textile markets, is the removal of the forming size by, for example, heat cleaning prior to finishing the fabric with a coloring agent-containing treatment tailored for fabric end application. Accordingly, it has generally been necessary to subject the glass fibers to three different processing steps, sizing in forming, heat cleaning and then applying a coloring agent, in order to achieve glass fibers or fabric which have a color forming material on their surface.

This invention provides a size composition suitable to impart color to glass fibers at forming, which fibers exhibit excellent color intensity in the absence of the heat cleaning process and the subsequent application of a coloring agent-containing treatment.

According to this invention, there is provided an aqueous size composition comprising a film-forming polymer, a thixotropic gelling agent, a heat-curable polyurethane latex and a organo silane coupling agent.

Also, according to this invention, there is provided at least one glass fiber at least a portion of the surface of which is in contact with a residue produced by removing water from an aqueous composition comprising a film-forming polymer, a thixotropic gelling agent, a heat-curable polyurethane latex and an organo silane coupling agent.

According to this invention, there is also provided a method for imparting color to glass fibers which comprises coating the glass fibers at forming with an aqueous size composition comprising a film-forming polymer, a thixotropic gelling agent, a heat-curable polyurethane latex and an organo silane coupling agent, and a coloring agent.

In one embodiment, the size composition of this invention can be applied to glass fibers coventionally employed to produce x-ray traceable yarns for incorporation into resins.

The aqueous size composition will contain from about 5 to about 20 weight percent of a film-forming polymer. In its preferred form, the size composition will contain about 10 weight percent of the film-forming polymer.

Any suitable film-forming polymer can be employed. Suitable film-forming polymers include polyvinyl acrylates, polyvinyl alcohols, polyvinyl acetates, mixtures thereof, and the like.

A particular suitable film-forming polymer is designated "Rhoplex HA-8", commercially available from Rohm & Haas Co. "Rhoplex HA-8" is a self-cross-linking polyethyl acrylate emulsion having a solids content of 45.5%, a pH of 3.0, a Brookfield Viscosity (#3 spindle, 60 rpm) at 25° C. of 550 cps, a torsional modulus of 300 kg/cm$^2$ at $-14°$ C., a specific gravity at 25° C. of 1.05, and is non-ionic.

Other particularly suitable film-forming polymers are designated "Rhoplex HA-12" and "Rhoplex HA-16", both commercially available from Rohm & Haas Co.

The aqueous size composition will contain from about 1 to about 5 weight percent of a thixotropic gelling agent. In its preferred form, the size composition will contain about 3 weight percent of the thixotropic gelling agent.

Any suitable thixotropic gelling agent can be employed in the size composition. Suitable thixotropic gelling agents include acid-containing acrylic emulsion copolymers and cellulose esters.

A particularly suitable acid-containing acrylic emulsion copolymer is designated "Acrysol ASE 108", commercially available from Rohm & Haas Co. "Acrysol ASE 108" has a solids content of 20%, a pH of 2.9, a Brookfield Viscosity (#1 spindle, 12 rpm) at 25° C. of 200 cps, and is anionic.

Other suitable acid-containing acrylic emulsion copolymers are designated "Acrysol ASE 60", "Acrysol ASE 75", and "Acrysol ASE 95", all commercially available from Rohm & Haas Co.

Particularly suitable cellulose esters are methylcellulose, ethylcellulose, hydroxypropyl methylcellulose, mixtures thereof, and the like. The cellulose esters employable in the coating composition are commercially available from The Dow Chemical Company under the tradename "Methocel".

The aqueous size composition will contain from about 2 to about 15 weight percent of a heat-curable polyurethane latex. In its preferred form, the size composition will contain about 6 weight percent of the heat-curable polyurethane latex.

Any suitable blocked or unblocked polyurethane latex can be used in the practice of this invention. The important feature desired in such latexes is that they be heat-curable. Particularly suitable heat-curable polyurethane latexes are designated "Nopcothane D641MH-30", commercially available from Diamond-Shamrock and "Latex X-1042", commercially available from BASF Wyandotte.

"Latex X-1042" is described in U.S. Pat. No. 3,401,133.

The aqueous size composition will contain from about 0.2 to about 1.5 weight percent of an organo silane coupling agent. In its preferred form, the size composition will contain about 0.5 weight percent of the organo silane coupling agent.

Any suitable organosilane coupling agent can be employed in the size composition.

A particularly suitable organosilane coupling agent is designated "C-600", commercially available from Dow Corning. "C-600" has the following chemical formula:

$CH_3OOCCH_2CH_2NH(CH_2)_2NH(CH_2)_3Si(OCH_3)_3$.

Other suitable organosilane coupling agents are designated "Z-6020" which is $H_2N(CH_2)_2HN(CH_2)_3Si(OCH_3)_3$ and "Z-2-2023" which is

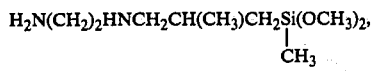

also available from Dow Corning and "A-1100" gamma-amimopropyltriethoxysilane, available from Union Carbide.

Additionally, if an acid-containing acrylic emulsion copolymer such as "Acrysol ASE 108" is employed as the thixotropic gelling agent in the size composition, it is preferred to introduce into the size composition a suitable base, such as ammonium hydroxide, in order to neutralize the functional groups on the acid-containing acrylic emulsion copolymer. If employed, ammonium hydroxide will be present in an amount within the range of from about 0.1 to about 0.5 weight percent of the aqueous size composition.

As indicated above, one or more coloring agents can be incorporated into the aqueous size composition in order to impart color to the resulting sized glass fibers.

Suitable for use as coloring agents are dyes and/or pigments, either organic or inorganic. Particularly suitable for use are water-dispersible pigments.

One particularly suitable pigment which can be employed in this invention is designated "4527-39A", a diarylide pigment commercially available from The Hershaw Chemical Co.

If employed, the coloring agent will be contained in the aqueous size composition in a total amount within the range of from about 1 to about 20 weight percent.

The aqueous size composition can also contain one or more glass fiber lubricants.

Any suitable cationic, anionic, or non-ionic lubrucant or mixture thereof can be employed.

Particularly suitable lubricants are those designated "Emery 6717" and "Emery 6760-U" both commercially availble from Emery Industries.

"Emery 6717" and "Emery 6760-U" are both amide substituted polyethyleneamines.

Also, any suitable polytetrafluoroethylene fluorocarbon resin dispersion can be employed as a lubricant in the practice of this invention.

Particularly suitable polytetrafluoroethylene fluorocarbon resin dispersions are designated "Teflon 30B TFE" and "Teflon 3338" both available from E. I. duPont de Nemours & Co. "Teflon 30B TFE" is a large particle (particle size of from about 0.26 to about 0.28 micron) dispersion having a specific gravity of dispersion (60% solids) value of 1.50, a resin weight (60% solids) of 7.5 pounds per gallon, a melting point of 327° ± 10° C., a specific gravity (sintered resin) of 2.20 to 2.27 and is white in color. "Teflon 3338" is similar to "Teflon 30B TFE" but has an intermediate particle size (about 0.20 micron) and comprises an organic additive.

If employed, the lubricant will be contained in the aqueous size composition in a total amount within the range of from about 0.2 to about 2 weight percent.

The aqueous size composition can also contain a silicone emulsion, which emulsion serves to impart wrinkle resistance to the resulting sized glass fiber fabric.

Any suitable silicone emulsion can be employed. A particularly suitable silicone emulsion is designated "DC-22", commercially available from Dow Corning.

If employed, the silicone emulsion will be contained in the aqueous size composition in an amount within the range of from about 0.5 to about 4 weight percent.

The aqueous size compositions can be prepared by conventional methods such as that described below.

The composition can be applied to any glass fibers conventionally employed to produce textile glass fiber textiles, being applied during the forming operation using any suitable application (e.g. the applicator of U.S. Pat. No. 3,498,262) such that the fibers possess, upon drying, a solids content within the range of from about 1 to about 3 percent by weight of the sized fiber as determined by loss on ignition.

Having described the ingredients usable in this invention, reference is now made to the following example which is provided by way of illustration and not by way of limitation of the practice of this invention.

EXAMPLE I

This example demonstrates the best mode for the preparation of approximately 100 gallons of a size composition of this invention.

About 186 pounds of deionized water, about 25 pounds of a thixotropic gelling agent ("Acrysol ASE 108") and about 4 pounds of ammonium hydroxide were added to the main mix tank with agitation at room temperature.

About 83 pounds of a film-forming polymer ("Rhoplex HA-8") were diluted with about 30 pounds of deionized water and the resulting solution was introduced into the contents of the main mix tank with agitation.

About 50 pounds of a heat-curable polyurethane latex ("Nopcothane D641M-30") were diluted with about 50 pounds of deionized water and the resulting solution was introduced into the contents of the main mix tank with agitation.

About 17 pounds of a silicone emulsion ("DC-22") were diluted with about 66 pounds of deionized water and the resulting solution was introduced into the contents of the main mix tank with agitation.

About 4 pounds of an organosilane coupling agent were diluted with about 25 pounds of deionized water and the resulting solution was introduced into the main mix tank with agitation.

About 8 pounds of a polytetrafluoroethylene fluorocarbon resin dispersion ("Teflon 30B TFE") were diluted with about 8 pounds of deionized water and the resulting solution was introduced into the contents of the main mix tank with agitation.

About 83 pounds of a coloring agent (Hershaw L4527-39A) and about 195 pounds of deionized water were introduced into the contents of the main mix tank, the contents were agitated for about thirty minutes, the resulting product recovered as a size composition of this invention and found to have a Brookfield Viscosity, Model LVT (#3 spindle, 30 rpm) of about 900 ± 200 cps. and a solids content of from about 12.5 to about 14.5 percent.

The resulting size composition is then applied to glass fibers in accordance with conventional technique to deposit on the glass fiber surfaces an amount of the size composition corresponding to an LOI of about 1.6% by weight. The resulting glass fibers, after processing into a forming package are then dried for a period of about 10 hours at a temperature of about 235° F. to form the colored glass fibers.

It will be evident from the foregoing that various modifications can be made to the present invention. Such, however, are considered as being within the scope of the invention.

What is claimed is:

1. An aqueous size composition for use in the treatment of glass fibers comprising (1) a heat-curable polyurethane latex (2) a film-forming polymer (3) a thixotropic gelling agent and, (4) at least one organo silane coupling agent.

2. A size composition as defined in claim 1 which includes a coloring agent.

3. A size composition as defined in claim 1 wherein the composition contains from about 2 to about 15% by weight of heat-curable polyurethane latex, from about 5 to about 20% by weight of the film-forming polymer, from about 1 to about 5% by weight of the thixotropic gelling agent and from about 0.2 to about 1.5% by weight of the coupling agent.

4. At least one glass fiber at least a portion of its surface having a thin film coating thereon, said coating being produced by removing water from an aqueous composition comprising (1) a heat-curable polyurethane latex, (2) a film-forming polymer (3) a thixotropic gelling agent and, (4) at least one organo silane coupling agent.

5. The glass fiber of claim 4 in which said composition includes a coloring agent to impart color to glass fibers treated with said composition.

6. The glass fiber of claim 4 in which the film forming polymer is selected from the group consisting of polyvinyl acrylates, polyvinyl alcohols and polyvinyl acetates.

7. Glass fiber of claim 4 in which the composition contains from about 2 to about 15% by weight of the heat-curable polyurethane latex, from about 5 to about 20% by weight of the film-forming polymer, from about 1 to about 5% by weight of the thixotropic gelling agent and from about 0.2 to about 1.5% by weight of the coupling agent.

8. A method for imparting color to glass fibers which comprises coating the glass fibers with an aqueous size composition comprising (1) a heat-curable polyurethane latex (2) a film-forming polymer (3) a thixotropic gelling agent (4) at least one organo silane coupling agent and, (5) a coloring agent.

* * * * *